Nov. 17, 1942.  H. KÜPPENBENDER ET AL  2,301,956

ROLLFILM CAMERA

Filed May 31, 1940  7 Sheets-Sheet 1

Inventors:
Heinz Küppenbender
Eugen Jörg
Ernst Rall
Heinrich Jacob
By: Singer, Ehlert, Stern & Carlberg
Attys.

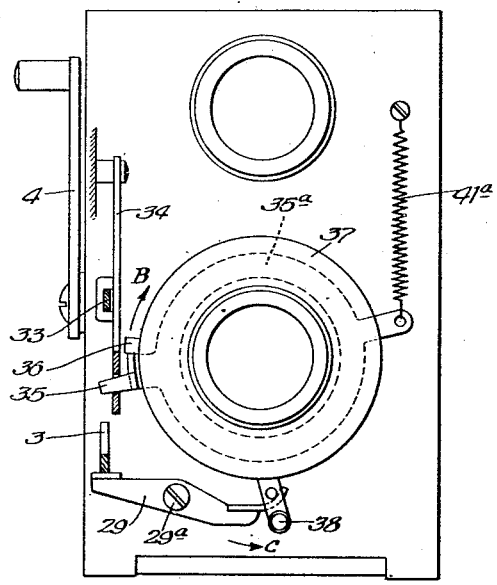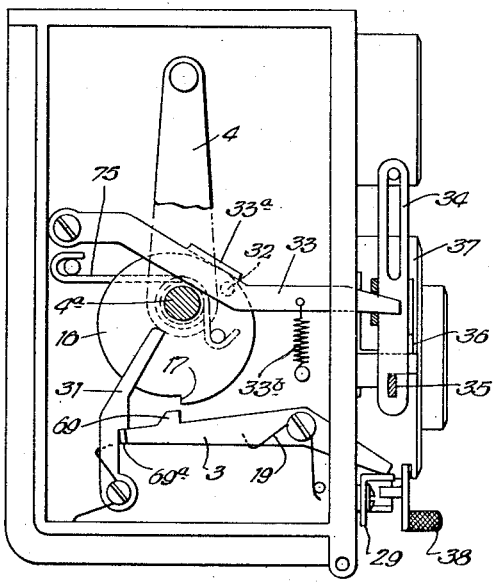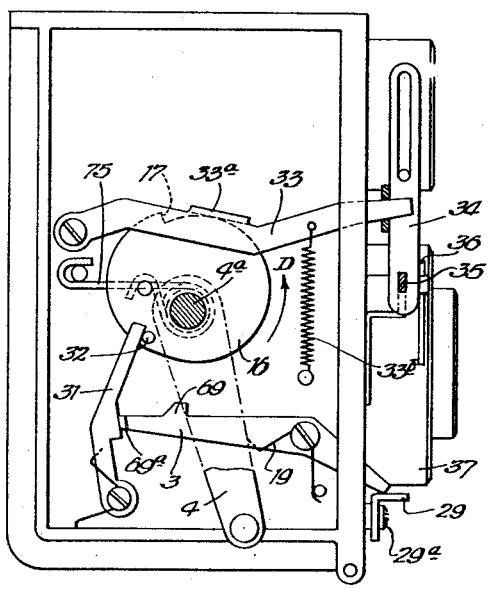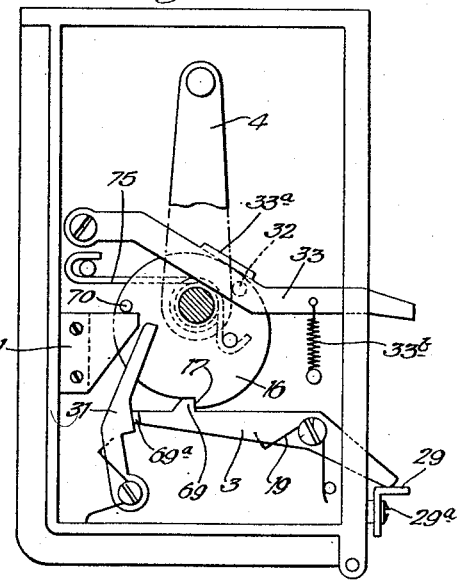

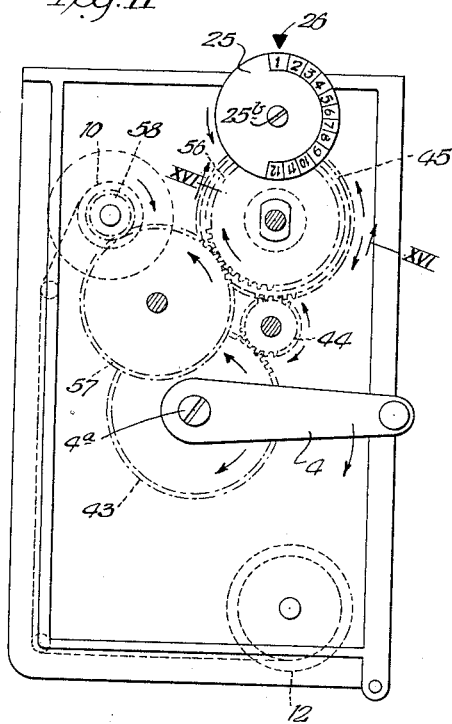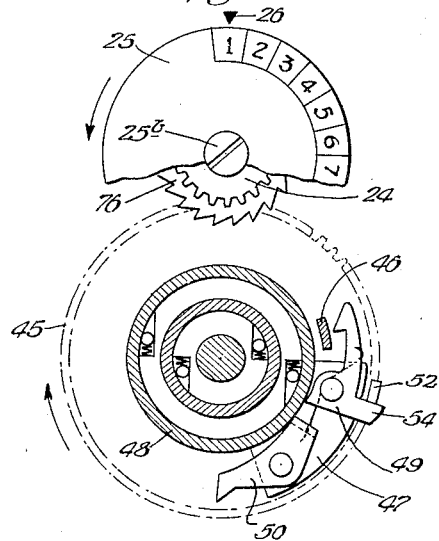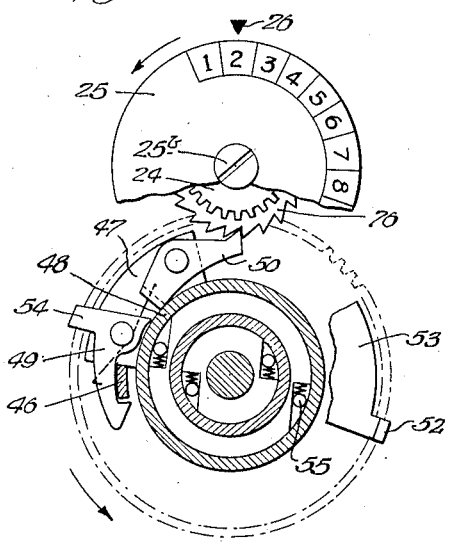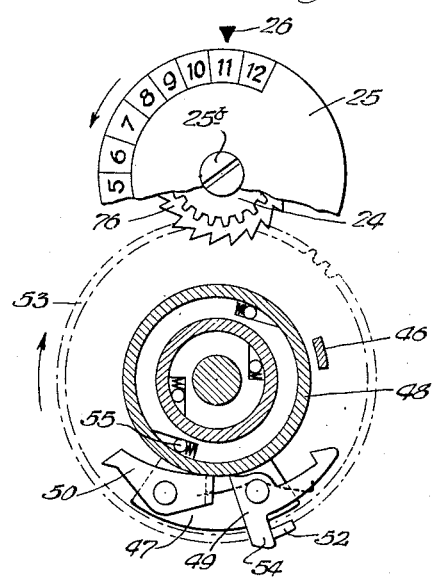

Nov. 17, 1942.    H. KÜPPENBENDER ET AL    2,301,956
ROLLFILM CAMERA
Filed May 31, 1940    7 Sheets-Sheet 7

Inventors:
Heinz Küppenbender
Eugen Jörg
Ernst Rail
Heinrich Jacob
By: Singer, Ehlert, Stern & Carlberg
Attys.

Patented Nov. 17, 1942

2,301,956

UNITED STATES PATENT OFFICE 2,301,956

ROLL-FILM CAMERA

Heinz Küppenbender, Dresden, Eugen Jörg and Ernst Rall, Stuttgart, and Heinrich Jacob, Berlin-Zehlendorf, Germany; vested in the Alien Property Custodian Application May 31, 1940, Serial No. 337,960
In Germany February 2, 1939

11 Claims. (Cl. 95—31)

The invention relates to improvements in rollfilm cameras and particularly is directed to twin lens mirror reflex cameras.

The principal object of the invention is to provide rollfilm cameras of the type in which the rollfilm is provided with or attached to a paper backing strip with a film advancing device which eliminates the observation of the numbers on the paper strip through a colored window usually arranged in the removable or hinged rear cover of the camera casing.

Another object of the invention is to provide the rollfilm camera with a manually actuatable crank handle which not only operates a film advancing means but also an exposure counting mechanism, the latter being operative only when the rear cover of the camera is closed.

It is another object of the invention to provide the rollfilm camera with an exposure counting mechanism which is automatically disconnected from the film advancing means and returns to its starting position after the entire rollfilm has been exposed and the operation of the film advancing means is continued to wind the trailing end of the paper backing strip upon the film take-up spool.

It is also an object of the invention to provide the camera with a film advancing means which upon actuation of said manually actuatable crank handle advances the film automatically a distance equal the length of one picture frame, regardless of the increasing diameter of the film on the film take-up spool.

Another object of the invention is to provide the film advancing means of the rollfilm camera with a reversible ratchet device which insures always a complete film advancing movement of the manually actuatable crank handle so that it is impossible to advance the next picture frame of the film only partially into exposure position, the same ratchet device is effective to insure a complete return movement of the manually actuatable crank handle to its initial position after the film has been advanced one complete picture frame.

Still another object of the invention is to provide a rollfilm camera with means for locking the film advancing means after the advance of one picture frame of the film and the provision of means for preventing the release of said locking means until the shutter of the camera has been actuated to expose the film.

A particular object of the invention is to provide the rollfilm camera with means for locking the film advancing means after each advance of one picture frame of the film, said locking means being controlled by the shutter tensioning lever which prevents an actuation of said film advancing means until the shutter has been tensioned and released again, said locking means in the position in which it permits an actuation of the film advancing means being effective to prevent an operation of the shutter release member.

Another object of the invention is to provide the rollfilm camera with means which automatically maintains the alternate locking means between the film advancing means and the shutter operating means inoperative until the customary leader of the rollfilm is wound upon the film take-up spool.

It is also an object of the invention to provide the rollfilm camera with means for automatically disconnecting said alternate locking means between the film advancing means and the shutter operating means after the entire rollfilm has been exposed, so that the trailing end of the paper backing strip of the film may be wound upon the take-up spool without the necessity of actuating the shutter during this operation.

Other objects of the invention will be apparent or will be specifically pointed out in the description forming a part of this specification, but the invention is not limited to the embodiments herein described, as various other forms may be adopted within the scope of the claims.

In the drawings:

Fig. 5 is a front elevation view of the camera, with the cover for the objective carrier omitted.

Figs. 6, 7 and 8 are side elevation views of the camera and illustrate each in a different position an alternately acting locking device arranged between the film advancing means, shutter tensioning means and shutter release means.

Fig. 11 illustrates more or less diagrammatically a side elevation view of the camera—the side wall being omitted again for the sake of clearness—to show the particular drive connection between the manually operable crank handle and the film take-up spool, which driving connection insures a uniform advance of the film, regardless of the increasing diameter of the film wound upon the take-up spool.

Figs. 12, 13, 14 and 16 illustrate in an enlarged scale and in different operating positions the details of the device which insures a uniform advancement of the film.

Fig. 19 shows the rear cover closed and Fig. 20 shows the rear cover partially open.

Fig. 21 shows the rear cover particularly open and Fig. 22 shows the rear cover closed.

Figure 1:
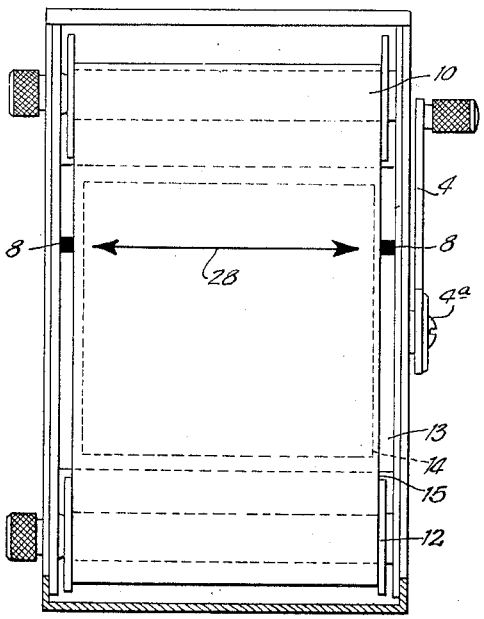
Fig. 1 is a rear view of the rollfilm camera with the separate rear cover removed and with a film in a position ready for being advanced upon closing of the rear cover.
Figure 2:
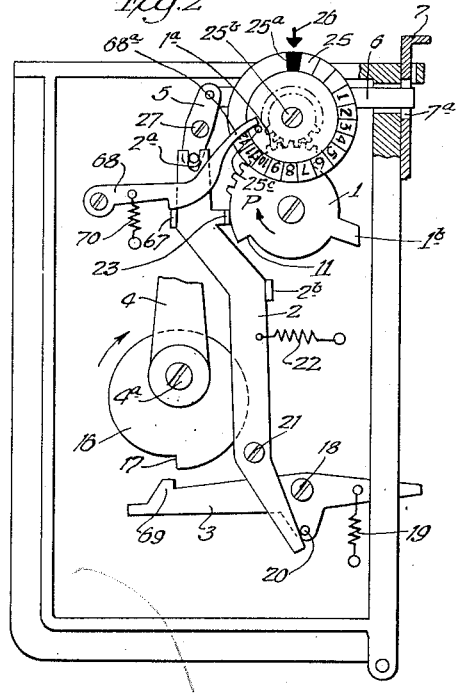
Figs. 2, 3 and 4 are side elevation views of the camera, with the side wall covering the operative parts omitted and each showing the exposure counter and its associated parts in a different position.
Figure 3:
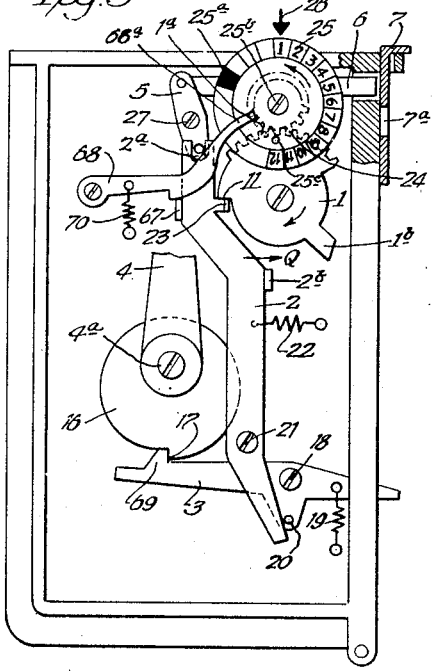
Figure 4:
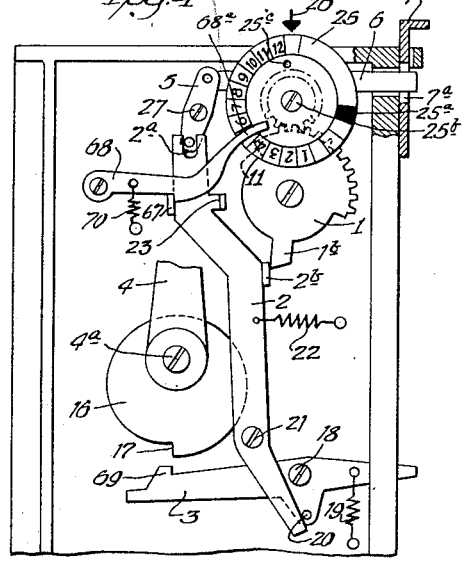

Referring to Fig. 1, the camera casing contains a removable film take-up spool 10 and also a removable film supply spool 12, the first one of which is adapted to be rotated in one direction by a crank handle 4. On both sides of the film guide 13 and adjacent the picture window 14 there are provided the markings 8. The film 15 has printed on the leading end of its paper backing a clearly visible line 28, which in the disclosed embodiment is provided with an arrow at each end pointed toward the markings 8. The crank handle 4 is mounted on a shaft 4ᵃ which also has mounted thereon a cam 16 (Figs. 2 to 4) provided with a shoulder 17 which is adapted to engage a projection 69 on a locking lever 3 pivotally supported between its ends by a pin 18 and subjected to the action of a spring 19. A pin 20 on the locking lever 3 engages the lower end of a control lever 2 which is pivotally supported between its ends at 21. A spring 22 attached to the control lever 2 at a point above its pivot axis normally tends to rotate the control lever 2 in clockwise direction. A projection 23 near the upper end of the control lever 2 engages the circumference of a cam 1—provided the control lever 2 is not held inoperative by a pawl 68, as shown in Fig. 4 for a purpose which will be explained later—which is provided with gear teeth 1ᵃ on a portion of its circumference. The gear teeth 1ᵃ mesh with a gear 24 on the shaft 25ᵇ of the exposure counter 25, which latter is actuated simultaneously with the film advancing means by the crank handle 4 in a manner described later. It will be obvious that the cam 1, which is provided with a shoulder 11, will be rotated whenever the gear 24 is rotated during an actuation of the crank handle 4 which advances the film. The exposure counter 25 consists of a circular disc provided with a dial having a red or other mark 25ᵃ, which corresponds to the line mark 28 on the film backing strip, and with numbers 1 to 12, each indicating the film frame which is in exposure position. A suitable pointer 26 is attached to the camera casing opposite the indicating numerals on the dial.

The upper end of the control lever 2 is connected by a pin and slot connection 2ᵃ with one end of a link 5 which is pivotally supported between its ends at 27. The other end of the link 5 is pivotally connected to a horizontally extending rod 6 which is adapted to enter an aperture 7ᵃ in the manually operable shutter release member 7 which is mounted on the camera body and is locked against operation when the rod 6 has been moved into the aperture 7ᵃ.

When a rollfilm is to be loaded and threaded into the camera the leading end of the customary paper strip backing is wound upon the take-up spool 10 until the printed line 28 is in alinement with the two opposite marks 8 on the film guide 13 of the camera casing. This adjustment of the film takes place while the camera casing is open. This being done, the rear cover of the camera is applied or closed and hereby the exposure counter 25, which is disconnected from the crank handle 4 when the rear cover is open, is automatically connected with the crank handle 4 in a manner as will be described hereinafter. When the camera is closed the pointer 26 will be opposite the red mark 25ᵃ on the dial. The crank handle 4 is now operated to execute a number of strokes until the number 1 on the dial is opposite the pointer 26, indicating that the first picture frame of the film covers the window 14 or in other words is in the focal plane of the camera, ready for an exposure. At the same time the first picture frame of the film moves into exposure position the cam 1 is rotated in the direction of the arrow P (Fig. 2), owing to the engagement of the gear 24 with the gear teeth 1ᵃ, and as soon as the pointer 26 is opposite the number 1 the projection 23 on the control lever 2 slips off the high point of the cam 1 and comes to lie under the shoulder 11 as shown in Fig. 3. This causes the control lever 2 to move about its pivot axis 21 in the direction of the arrow Q (Fig. 3), so that the lever 3 is moved with its end having the projection 69 thereon toward the cam 16 on the shaft 4ᵃ. When the crank handle 4 has been returned to its initial position, as illustrated in the Figs. 1 to 4, the projection 69 engages the shoulder 17 and prevents a repeated action of the crank handle 4 until the lever 3 is moved out of its locking position illustrated in Fig. 3. The just described actuation of the control lever 2 also causes an operation of the link 5 which withdraws the rod 6 from the aperture 7ᵃ, thus unlocking the shutter release member 7 and the latter is free to be operated. Upon an actuation of the shutter release member 7, which causes the first film section to be exposed, the outwardly projecting end of the locking lever 3 is actuated by a member of the shutter so as to rotate anti-clockwise into a position indicated in Fig. 2. The crank handle 4 can now be rotated again in clockwise direction to advance the second frame of the film into the window 14 and hereby actuates the exposure counter 25 in the same manner as before. It is of advantage if especial marks—not shown—are provided near the picture window 14 said marks being visible from outside the closed camera, for instance by means of windows in the rear cover, for the purpose of indicating if the camera is loaded with roll film or not.

According to Fig. 5 a lever 29 is pivotally supported between its ends at 29ᵃ on the front wall of the camera casing, so as to extend with one of its ends into the path of the shutter release lever 38 on the shutter casing. The other end of the lever 29 rests against that end of the locking lever 3 which projects outwardly from the camera casing (Figs. 6 to 8). In this instance, the inner end of the locking lever 3 has in addition to the projection 69, which cooperates with the cam 16, a second projection 69ᵃ for controlling a spring influenced holding pawl 31. The cam 16 is provided with a laterally extending pin 32 which is adapted to engage the free end of the pawl 31. Furtherfore, a lever 33 is pivotally attached with one end to the side wall of the camera casing and has between its ends a laterally bent lug 33ᵃ which rests loosely on the upper half of the circumference of the cam 16. A spring 33ᵇ pulls the lever 33 downwardly in constant engagement with the cam 16. The free end of the lever 33 projects outwardly through the front wall of the camera casing and is operatively connected with a vertically suspended bar 34 which is mounted for lengthwise sliding movement on the camera front wall. The lower end of the bar 34 is operatively connected with a radial projection 35 (Figs. 5 and 6) on a ring 35ᵃ which is freely rotatable about the axis of the photographic objective and is normally urged by a spring 41ᵃ in anti-clockwise direction. The projection 35 when moved in the direction of the arrow B is adapted to engage and actuate a projection 36 on the shutter tensioning ring of the photographic shutter 37 which in the present case is constructed in the form of a so called central shutter.

When the shutter 37 has been released directly by actuating the lever 38 or indirectly by actuating the shutter release member 7 and during its release has caused the camera objective to expose the film section in the window 14 the crank handle 4 will be free to advance the film to the next picture. This is done by rotating the crank handle 4 in clockwise direction (Figs. 6 and 7) about 180°. During this rotation the cam 16 raises the lever 33, which in turn raises the bar 34 so that the projection 35 is moved clockwise (Fig. 5).

The shutter is provided with a locking device (not shown) built into the shutter housing; this device allows new release only after the shutter is tensioned for the next exposure.

The projection 35 upon engaging the projection 36 on the shutter tensioning ring moves the latter into a position in which the shutter 37 is tensioned. The shutter release lever 38 or the release member 7 may now again be actuated to release the shutter by rotating the lever 38 in the direction of the arrow C in Fig. 5. Upon an actuation of the shutter release lever 38 the lever 29 unlocks the locking lever 3 from the cam 16, so that the crank handle 4 is again free to be actuated to advance the film. The holding lever 31, however, maintains the locking lever 3 out of engagement with the cam (Figs. 6 and 7) until the film advance is completed and the shutter is tensioned, whereupon the pin 32 on the cam 16 at the end of the stroke of the crank lever 4 engages the free end of the holding lever 31 and moves the latter anti-clockwise a sufficient distance that the projection 69ᵃ of the locking lever 3 is freed. Owing to the spring acting on the locking lever 3, the latter will then be moved in engagement with the circumference of the cam 16 and when the crank handle 4 has been returned to its initial position (Fig. 8) the projection 69 will engage the shoulder 17 and thereby the crank handle is again locked against operation to wind up the film.

Figure 9:
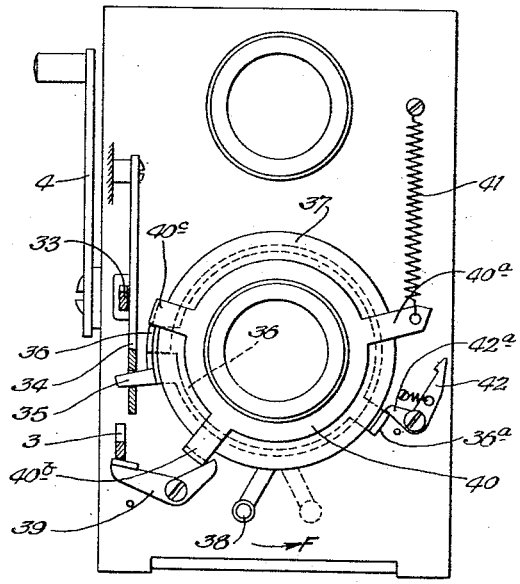
Figs. 9 and 10 are front elevation views of a somewhat modified construction of a rollfilm camera and illustrate the locking device between the film advancing means and the shutter in a position when the shutter is released and tensioned respectively.
Figure 10:
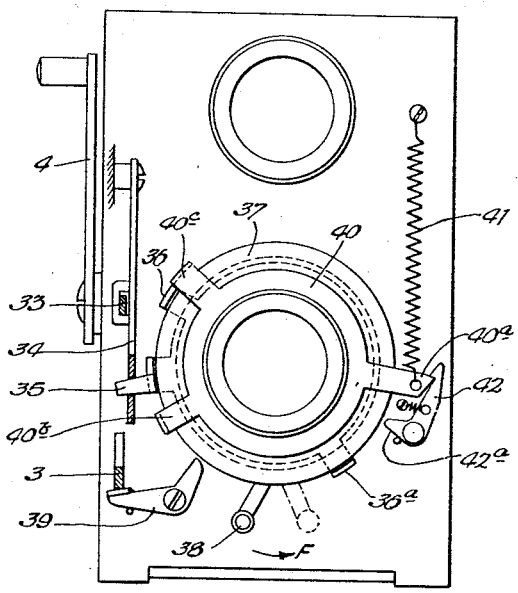

In the embodiment of the invention as illustrated in the Figs. 9 and 10 the lever 29 of the Figs. 5 to 8 is subsituted by a lever 39 one end of which is positioned in the path of movement of a radial arm 40ᵇ on a ring 40 which is rotatable about the axis of the alined shutter 37 and photographic objective. The other end of the lever 39, as in the other case, is engaged by the locking lever 3. Another radial arm 40ᵃ on the ring 40 is connected to a tension spring 41 and also is adapted to be locked to one arm 42 of a spring-actuated bell crank lever pivotally mounted on the camera casing. The other arm 42ᵃ of the bell crank lever extends into the path of movement of a radial projection 36ᵃ on the shutter tensioning ring.

When the film is advanced by operating the crank handle 4 the lever 33 and the bar 34 rotate the radial projection 35 clockwise, thereby engaging the projection 36 on the shutter tensioning ring and moving the latter into a position in which the shutter 37 is tensioned. During this tensioning movement the radial projection 36 on the shutter tensioning ring engages a radial arm 40ᶜ on the ring 40 and moves the latter clockwise from the position shown in Fig. 9 to the position shown in Fig. 10. Hereby the spring 41 is tensioned, and the radial arm 40ᵃ is locked to the arm 42 of the bell crank lever.

Upon a release of the shutter, which is accomplished by moving the shutter release lever 38 or the release member 7 in the direction of the arrow F (Fig. 10) the shutter tensioning ring returns to its initial position illustrated in Fig. 9 at the end of the shutter release movement. During the return movement of the shutter tensioning ring the projection 36ᵃ of the latter engages and actuates the arm 42ᵃ of the bell crank lever, so that the latter releases the arm 40ᵃ, which under the action of the spring 41 returns to its initial position shown in Fig. 9. During this return movement of the arm 40ᵃ and the ring 40 the radial arm 40ᵇ on the latter actuates the lever 39 which in turn moves the locking lever 3 out of locking engagement with the cam 16, so that the crank handle 4 is free to advance the film. It will be noted that the locking device between the shutter release means and the film advancing means is unlocked by elements coming into action during the release movement of the shutter.

Figure 15:
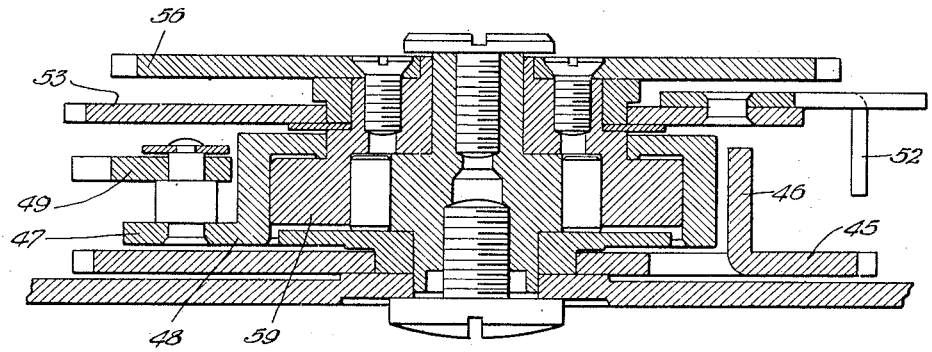
Fig. 15 illustrates an enlarged sectional view taken substantially along the line XV—XV of Fig. 11.
Figure 16:
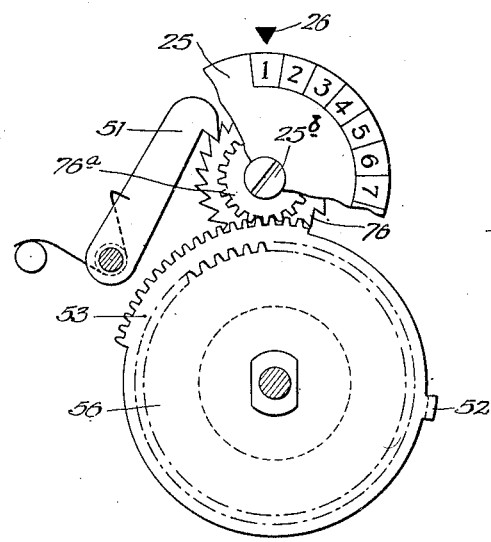

Referring now to the Figs. 11 to 16, which illustrate particularly the means for insuring a uniform advancement of the film during each operating stroke of the crank handle 4, it will be noted from Fig. 11 that upon an actuation of the crank handle 4 a gear 43 on the shaft 4ᵃ of the handle 4 drives a gear 44 meshing with a gear 45, the latter being provided with a lateral projection 46 (Figs. 12 to 15) adapted to engage a radial projection 47 on the circumference of a casing 48 loosely rotatable about the axis of the gear 45 and containing a free-wheeling mechanism. When the lateral projection 46 of the gear 45 engages the radial projection 47 of the casing 48 and pushes the same in a clockwise direction a spring influenced pawl 49, pivotally mounted on the radial projection 47, hooks itself to the lateral projection 46 as may be observed from Fig. 12. Shortly before the end of the stroke of the crank handle 4 a second pawl 50 (Figs. 13 and 14), which is also pivotally mounted on the radial projection 47, engages a ratchet wheel 76 of the exposure counter 25 and moves the same one step or one tooth. A holding pawl 51 (Fig. 16) prevents a return movement of the ratchet wheel 76, which, as will be described hereinafter in connection with the Figs. 21 to 23, tends to return to its initial position under the influence of a return spring (not shown). When the exposure counter 25 is advanced in this manner to the next number a gear 76ª on the axis 25ᵇ of the counter 25 is likewise rotated and advances a gear segment 53, on which a laterally extending stop 52 is provided, one step in clockwise direction (Figs. 12 to 16). The gear segment 53 is loosely rotatable about the axis of the gear 45. When the crank handle 4 is returned to its initial position the gears 43, 44 and 45, of course, are caused to rotate in the opposite direction as heretofore, and during this return movement the lateral projection 46 on the gear 45, owing to its latched engagement with the pawl 49, rotates the casing 48 rearwardly, that is anti-clockwise, until the projection 54 on the pawl 49 engages the stop 52 on the gear segment 53 (Fig. 12) whereby the pawl 49 is released from the projection 46 so that from this point on the crank handle 4 and its associated gearing 43, 44 and 45 return alone to their starting position. During the time the casing 48 is rotated clockwise by the lateral projection 46 the casing 48 by means of the clamping rollers 55 (Fig. 13) is coupled to a rotary member 59, which is arranged coaxially with the casing 48. The member 59 has a gear 56 attached thereto which by means of the gears 57 and 58 is drivingly connected with the film take-up spool 10 (Figs. 11 and 15). During the return movement of the casing 48, however, the rollers 55 are ineffective and the parts 59, 56, 57 and 58 remain in the position they have been moved by the casing 48. Since the stop 52 is advanced a certain predetermined amount in clockwise direction during each advancement of the film by the crank handle 4, it follows that the lateral projection 46 engages the radial projection 47 at a different in clockwise direction more advanced point during each successive operation of the crank handle. This has the result that the angular rotation of the casing 48 and therewith the angular rotative wind-up movement of the film take-up spool 10 will be less each time one exposure has been made. The difference between each successive angular rotation is such as to compensate for the increasing diameter of the amount of the film wound upon the take-up spool, so that always the same length of film is advanced during each film advancing stroke of the crank handle 4.

Figure 17:
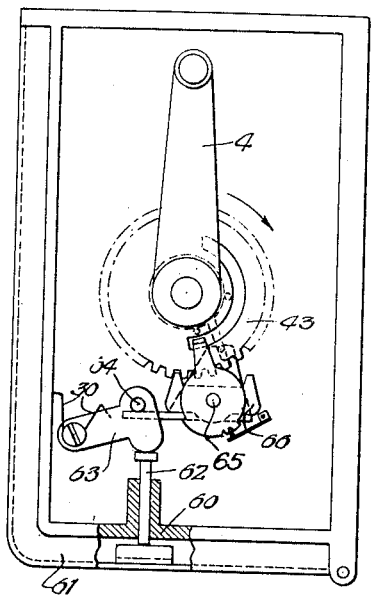
Figs. 17 and 18 illustrate each in a side view the alternately effective ratchet device for the film advancing means when the rear cover of the camera is closed and in open position respectively.
Figure 18:
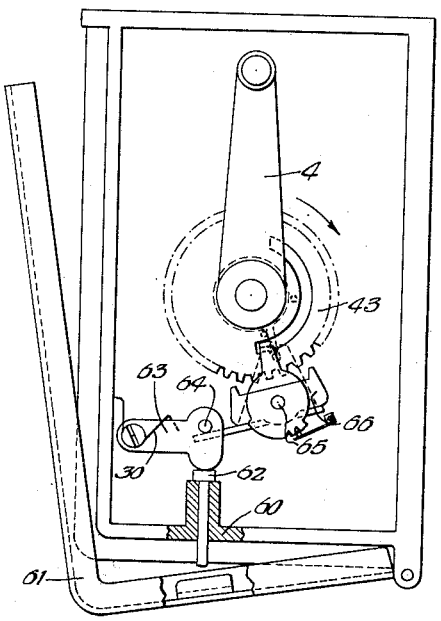

According to the Figs. 17 and 18 a pin 62 is slidably mounted in the bottom wall 60 of the camera casing and when the rectangularly shaped rear cover 61 of the camera is closed the pin 62 is moved inwardly as shown in Fig. 17. The inner end of the pin 62 engages a pivotally mounted lever 63 and pushes the same upwardly against the action of a spring 30. A pin 64 on the lever 63 moves an alternately acting ratchet device 66, which is tiltably mounted at 65, in engagement with the gear 43 on the crank handle 4. The ratchet device 66 is rendered inoperative when the rear cover 61 of the camera is opened (Fig. 18), but is automatically rendered operative when the rear cover 61 is closed and prevents a reverse movement of the crank handle 4 until the movement in forward or rearward direction has been completed, thus insuring always a complete advancement of the next film section and a complete tensioning of the shutter respectively.

In order to limit the return movement of the crank handle 4 the cam 16 is provided with a second laterally extending pin 70 (see Fig. 8) which is adapted to engage a stationary stop member 71 in the camera casing. This pin 70 and stop member 71 are shown only in Fig. 8 in order not to make the other figures too complicated.

Figure 24:
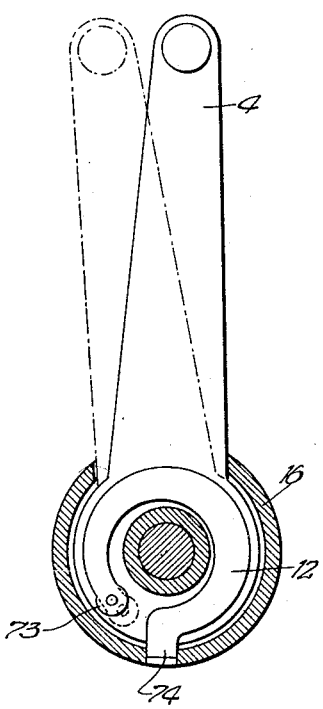
Fig. 24 illustrates in an enlarged view the particular construction of the crank handle of the camera.

Furthermore, the crank handle 4 is not rigidly connected with the cam 16, but by means of a circular leaf spring 72 as illustrated in Fig. 24. One end 73 of the spring 72 is attached to the hub portion of the crank handle 4 and the other end 74 is attached to the cam 16. A return spring 75 (Figs. 6 to 8) tends to return the crank handle 4 to its normal approximately vertical position. During the return movement of the crank handle 4 it may move, owing to the circular leaf spring 72, a small distance beyond its starting position as is shown in dotted lines in Fig. 24, which is desirable so that the locking lever 3 has sufficient time to drop with its projection 69 behind the shoulder 17. If desired, the circular leaf spring 72 may be substituted by any other means which permits the crank handle 4 to move a fraction beyond its starting position. It is, for instance, possible to mount the pin 70 yieldingly or provide a stop member 71 which is resilient.

After the entire roll film is exposed it is necessary that the trailing end of the paper backing strip be wound upon the take-up spool 10 before the camera can be opened for the removal of the exposed roll film. During the winding of the trailing end of the film it is, of course, required that the locking device for the crank handle 4 be released, while it is desirable that the shutter be locked against release. In this respect, the present invention, according to Figs. 2 to 4 provides the control lever 2 near its upper end with a projection 67 adapted to be engaged by a pawl 68 which is pivotally attached to the camera casing and subjected to the action of a spring 70. When the last section of the film is exposed, at which time the exposure counter 25 indicates 12, the crank handle 4 is again actuated to advance the film. In doing this the counter 25 moves beyond the numeral 12 and the cam 1 engages by means of the projection 1ᵇ the control lever 2 to rotate the same anti-clockwise somewhat beyond its normal starting position (Fig. 4), so that the pawl 68 engages the projection 67 and prevents a return movement of the control lever 2 and therewith an engagement of the locking lever 3 with the cam 16. In this position the crank handle 4 can be actuated until the trailing end of the film has been wound upon the take-up spool 10. During this operation the shutter release member 7 is locked against release by the rod 6 which extends into the aperture 7ª. In order to release the pawl 68 when the rear cover 61 of the camera is closed after being loaded with a new roll film, the said pawl is provided with a projection 68ª cooperating with a lug 25ᶜ on the exposure counter disc 25 in such a manner that the pawl becomes disengaged from the projection 67 of the lever 2 when the exposure counter 25 is rotated from the red mark 25ᵃ to the number 1 of the dial opposite to the pointer 26.

Figure 19:
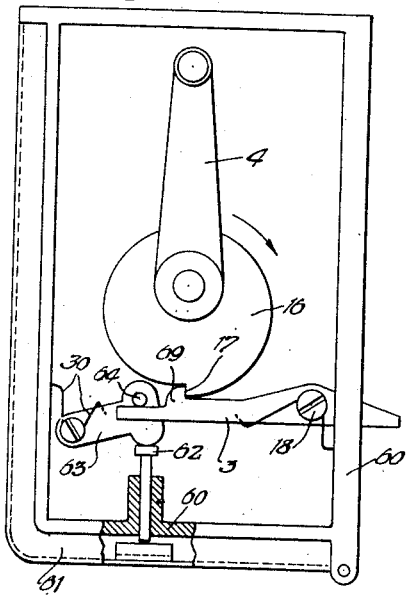
Figs. 19 and 20 illustrate each in a side view a locking device for the film advancing means, which locking device is controlled by the position of the rear cover of the camera.
Figure 20:
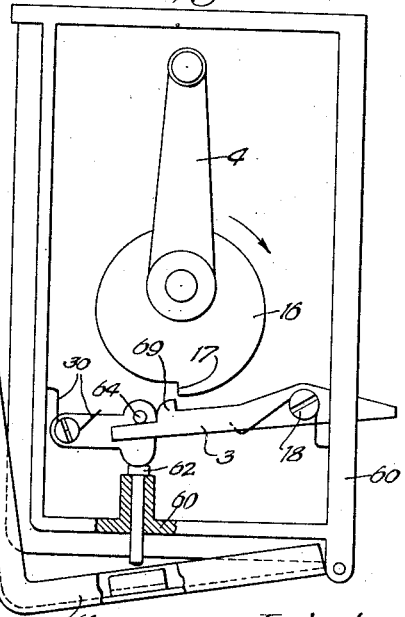

The previously mentioned rear cover controlled lever 63 and the pin 64 thereon are also used according to Figs. 19 and 20, for moving the locking lever 3 into operative position with respect to the cam 16, if the locking lever 3 is not rendered ineffective by the above described means which function after the release of the shutter, so as to permit a further advance of the film a distance equal to one frame. When the rear cover 61 is opened, to remove an exposed roll film and to insert a new roll film, the pin 62, owing to the lever 63 which is urged downwardly by the spring 30, is pushed so far outwardly that the projection 69 on the locking lever 3 is moved away from the shoulder 17 on the cam 16, so that the cam 16 can be rotated.

Figure 21:
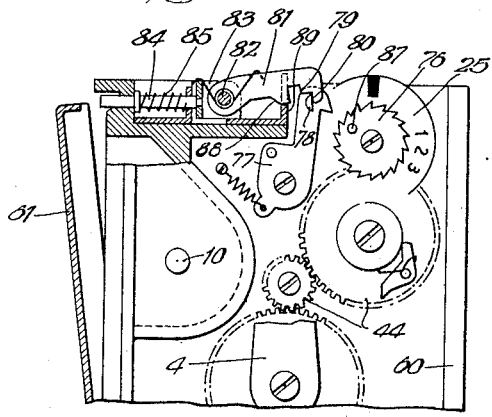
Figs. 21 and 22 illustrate each in a side view the upper portion of the camera and particularly a device which is controlled by the rear cover and influences the operation of the exposure counter.
Figure 22:
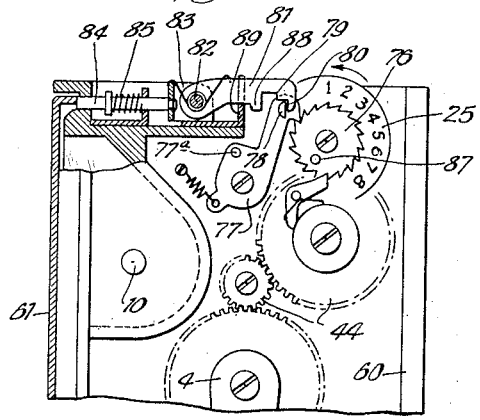
Figure 23:
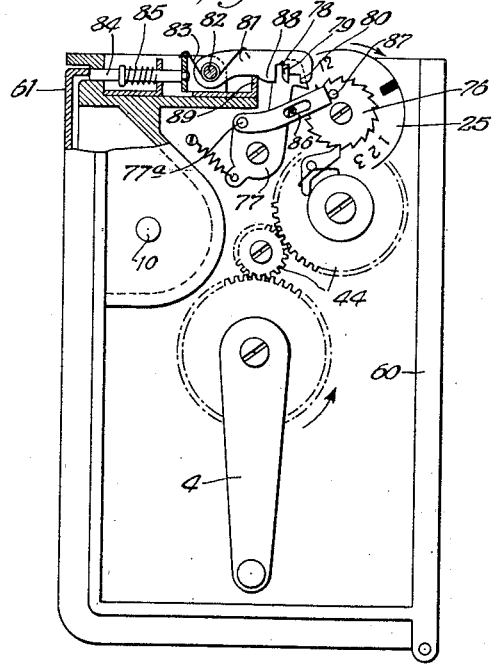
Fig. 23 illustrates in a side view similar to the Figs. 21 and 22 the complete camera with the exposure counter in a position when the last picture frame of the film has been moved in the focal plane of the camera objective.

According to the Figs. 21 to 23 the ratchet wheel 76 is mounted on the axis of the exposure counter 25 and is adapted to be engaged by a spring influenced holding pawl 77 which is pivotally mounted in the camera casing.

A return spring (not shown) is attached with one of its ends to the axis of the counter 25 and with its other end is anchored to the camera casing 60. The holding pawl 77 is provided with a laterally extending pin 78 adapted to engage with recesses 79 and 80 in a spring-influenced catch pawl 81 which is pivotally attached at 82 to a slide 83. The slide 83 is guided for horizontal rectilinear movement in the camera casing and has a rearwardly extending pin 84 adapted to be engaged by the rear cover 61 when the same is closed. A spring 85 which surrounds the pin 84 urges the slide 83 rearwardly so as to lift the holding pawl 77 out of engagement with the ratchet wheel 76 as soon as the rear cover 61 is opened. According to Fig. 23 the holding pawl 77 has pivotally attached thereto at 77ᵃ a link 86 in such a position that the free end of the same may engage a stop pin 87 on the ratchet wheel 76. The catch pawl 81 is also provided in rear of the recesses 79, 80 with an inclined face 88 which is adapted to engage a projection 89 on the camera casing. When the rear cover 61 of the camera casing is opened the slide 83 with the catch pawl 81 thereon is moved toward the left under the action of the spring 85 (Fig. 21). The result is that the holding pawl 77 is lifted out of engagement with the ratchet wheel 76, since the pin 78 lies in the recess 80. The exposure counter 25 is now released and returns under the action of the return spring into its starting position illustrated in Fig. 2. In order to prevent a rotation of the exposure counter 25 beyond a predetermined point further than the number 12 of the dial after the last picture, namely No. 12, has been taken, the stop pin 87 engages at this predetermined point the link 86 and upon a further rotation of the ratchet wheel 76 the holding pawl 77 is lifted out of the ratchet wheel 76, whereby the pin 78 is moved into the recess 79 of the catch pawl 81. This has also the result that the ratchet wheel 76 is released so as to permit the exposure counter 25 to return to its initial position, regardless of any additional stroke of the crank handle 4 which may be necessary to wind the trailing end of the film backing paper strip upon the take-up spool 10.

When the film is completely wound upon the take-up spool 10 and then the rear cover 61 is opened, the spring 85 moves the slide 83 and therewith catch pawl 81 toward the left, thus causing the catch pawl 81 to be raised when its inclined face 88 slides along the projection 89. The pin 78 will drop from recess 79 into the recess 80 of the catch pawl 81 and upon a subsequent closing of the rear cover 61 the holding pawl 77 will again properly engage the ratchet wheel 76 and the latter will be moved step by step to actuate the counter 25 during each film advancing stroke of the crank handle 4.

What we claim as our invention is:

1. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, manually operable means including a gearing for rotating said film take-up spool in one direction, an exposure counter, means for operatively connecting said gearing with said exposure counter, for operating the latter when said take-up spool is rotated by said manually operable means, means automatically setting said exposure counter to a predetermined position corresponding with the predetermined position for the film, and means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound.

2. In a photographic camera for rollfilm having a paper backing, in combination, a camera casing having film guiding means for supporting the film in the focal plane of the camera, a separate rear cover for said camera casing, marks on said film guiding means with which an indicating mark on the rear face of the leading end of the paper backing of the film is adapted to be brought in alinement while the said rear cover is open, a manually rotatable handle for rotating a film take-up spool in the camera casing in one direction, a rotatable exposure counter, means including a gearing for operatively connecting said rotatable handle with said exposure counter, to operate the latter by said handle when the film take-up spool is rotated means automatically setting said exposure counter to a predetermined position corresponding with the predetermined position for the film, means controlled by the cover for releasing said automatic means when the cover is open and for restraining said automatic means when the cover is closed, said cover controlled means rendering said operative connecting means operative to operate said exposure counter when said rear cover is closed and rendering said operative connecting means inoperative when said rear cover is opened said predetermined position of the counter being maintained until the cover is closed and the film wound.

3. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, a manually rotatable handle and a gearing connected therewith for rotating said film take-up spool in one direction, a rotatable exposure counter, means for operatively connecting said gearing with said exposure counter for operating the latter when said take-up spool is rotated by said manually rotatable handle, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, a photographic shutter of the type provided with a tensioning member and a separate release member, means operated by said rotatable handle for actuating said shutter tensioning member to tension the shutter when said film is advanced, means controlled by said operative connecting means for locking said rotatable handle against further rotation in a film winding direction as soon as the first film section has been moved into a position for exposure, and means operated by said shutter release member when the same is actuated to unlock said rotatable handle, so that the same can be rotated to advance the next unexposed film section into a position for exposure and at the same time advance the exposure counter and tension the shutter.

4. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, manually operable means including a gearing for rotating said film take-up spool in one direction, an exposure counter, means for operatively connecting said gearing with said exposure counter for operating the latter when said take-up spool is rotated by said manually operable means, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, and means controlled by the manually operable means for releasing the automatic means when the manual means is operated to wind the trailing end of the paper backing up the take-up spool.

5. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, a manually rotatable handle and a gearing connected therewith for rotating said film take-up spool in one direction, a rotatable exposure counter, means for operatively connecting said gearing with said exposure counter for operating the latter when said take-up spool is rotated by said manually rotatable handle, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, and means controlled by the manually rotatable handle for releasing the automatic means to permit the exposure counter to return to its initial position when the entire rollfilm is exposed and said rotatable handle is operated to wind the trailing end of the paper backing upon the take-up spool.

6. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, a manually rotatable handle and a gearing connected therewith for rotating said film take-up spool in one direction, a rotatable exposure counter, means for operatively connecting said gearing with said exposure counter for operating the latter when said take-up spool is rotated by said manually rotatable handle, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, means for locking said rotatable handle against further rotation in a film winding direction as soon as the first section of the film is moved into a position for exposure, a photographic shutter of the type having a tensioning member and a separate release member, and means operated by said shutter release member when the same is actuated to unlock said rotatable handle, so that the same can be rotated to advance the next film section into a position for exposure.

7. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, a manually rotatable handle and a gearing connected therewith for rotating said film take-up spool in one direction, a rotatable exposure counter, means for operatively connecting said gearing with said exposure counter for operating the latter when said take-up spool is rotated by said manually rotatable handle, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, a photographic shutter of the type provided with a tensioning member and a separate release member, means operated by said rotatable handle for actuating said shutter tensioning member to tension the shutter when said film is advanced, means controlled by said operative connecting means for locking said rotatable handle against further rotation in a film winding direction as soon as the first film section has been moved into a position for exposure, means operated by said shutter release member when the same is actuated to unlock said rotatable handle, so that the same can be rotated to advance the next unexposed film section into a position for exposure and at the same time advance the exposure counter and tension the shutter.

8. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, a manually rotatable handle and a gearing connected therewith for rotating said film take-up spool in one direction, a rotatable exposure counter, means for operatively connecting said gearing with said exposure counter for operating the latter when said take-up spool is rotated by said manually rotatable handle, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, a photographic shutter including a tensioning member and a release member, a cam coaxially arranged with said latter, a pivotatable handle and rotated by the latter, a pivotally mounted lever engaging said cam and operated by the latter to operate the shutter tensioning member when the handle is operated to advance the film, and a locking lever adapted to engage a shoulder on said cam and thereby limit the rotative movement of the handle when the film has been advanced the length of one picture, said locking lever being moved out of its locking position by the shutter release member when the latter is actuated to release the tensioned shutter.

9. In a photographic camera as claimed in claim 8, and means operated by said exposure counter after the last film section has been exposed for maintaining said locking lever in its unlocked position to which it is shifted during the following rotation of the handle, so that the trailing end of the film backing strip can be wound upon the take-up spool.

10. A photographic camera as claimed in claim 8, including means operated by said exposure counter after the last film section has been exposed for maintaining said locking lever in its unlocked position to which it is shifted during the following rotation of the handle, so that the trailing end of the film backing strip can be wound upon the take-up spool, said last named means including a cam driven by said exposure counter, a control lever adapted to be actuated by said last named cam, and a holding pawl engaging said control lever when the latter is actuated by said last named cam, said control lever in the position in which it is engaged by said holding pawl engaging said locking lever and keeping the same out of operative position.

11. In a photographic camera for rollfilm having a paper backing, the combination with a camera casing having film guiding means with indicating marks thereon and a separate rear cover, of indicating means on the rear face of the leading end of the paper backing of the rollfilm for adjusting the latter to a predetermined position in the camera by bringing said indicating marks in alinement with said indicating means before said rear cover is closed, a film take-up spool, manually oscillatable handle and a gearing connected therewith for rotating said film take-up spool in one direction, a rotatable exposure counter, means for operatively connecting said gearing with said exposure counter for operating the latter when said take-up spool is rotated by said manually oscillatable handle, means automatically setting said exposure counter to a predetermined position corresponding with the predetermined position for the film, means controlled by the cover for releasing the automatic means when the cover is open and for restraining said automatic means when the cover is closed, said cover controlled means rendering said operative connecting means operative to operate said exposure counter when said rear cover is closed and rendering said operative connection inoperative as soon as said rear cover is opened, said predetermined position of the counter being maintained until the cover is closed and the film wound, a photographic shutter including a tensioning member and a release member, a cam coaxially arranged with said oscillatable handle and oscillated with the latter, a pivotally mounted lever engaging said cam and operated by the latter to operate the shutter tensioning member when the handle is operated to advance the film the length of one picture, a locking lever adapted to engage a shoulder on said cam after the handle has been returned to its initial position, whereby a further movement of the handle to advance the film is prevented until the shutter is released, said locking lever being moved out of its locking position by the shutter release member when the latter is actuated to release the tensioned shutter, a ratchet device associated with said oscillatable handle for preventing an incomplete movement of the handle in either direction, and means controlled by said rear cover for rendering said ratchet device inoperative when the rear cover is opened.

HEINZ KÜPPENBENDER.
EUGEN JÖRG.
ERNST RALL.
HEINRICH JACOB.